Dec. 18, 1945.   L. N. SCHWIEN   2,391,197
SYSTEM FOR CONTROLLING CABIN PRESSURE OF AIRCRAFT
Filed Feb. 24, 1941   5 Sheets-Sheet 1

Inventor:
Leo Nevin Schwien.
Attorneys.

Fig. 4.

Dec. 18, 1945.     L. N. SCHWIEN     2,391,197
SYSTEM FOR CONTROLLING CABIN PRESSURE OF AIRCRAFT
Filed Feb. 24, 1941     5 Sheets-Sheet 3

Inventor.
Leo Nevin Schwien.

Barkelew & Scantlebury
Attorneys.

Dec. 18, 1945.　　　L. N. SCHWIEN　　　2,391,197
SYSTEM FOR CONTROLLING CABIN PRESSURE OF AIRCRAFT
Filed Feb. 24, 1941　　　5 Sheets-Sheet 4

Inventor.
Leo Nevin Schwien.

Attorneys.

Dec. 18, 1945.  L. N. SCHWIEN  2,391,197
SYSTEM FOR CONTROLLING CABIN PRESSURE OF AIRCRAFT
Filed Feb. 24, 1941  5 Sheets-Sheet 5

Inventor.
Leo Nevin Schwien.

Attorneys.

Patented Dec. 18, 1945

2,391,197

UNITED STATES PATENT OFFICE 2,391,197

SYSTEM FOR CONTROLLING CABIN PRESSURE OF AIRCRAFT

Leo Nevin Schwien, Los Angeles, Calif., assignor to L. N. Schwien Engineering Co., Los Angeles, Calif., a limited partnership composed of Leo Nevin Schwien, Louise Korbel Schwien, Georgia Korbel, Mary Korbel, and Frances Korbel, all of California Application February 24, 1941, Serial No. 380,281

15 Claims. (Cl. 98—1.5)

This invention relates generally to systems for controlling the interior air pressure of supercharged aircraft cabins.

It is now becoming common practice to supercharge the cabins of aircraft above altitudes of about 8,000 ft., the lowered atmospheric pressure at about that elevation beginning to be "felt" by the passengers, as is well understood. However, not only is it desirable to supercharge above an elevation of about 8,000 ft., but it is further desirable that the differential of pressures internally and externally of the cabin be not allowed to exceed some predetermined maximum governed by considerations of cabin structure strength against bursting strains. The problem, therefore, is to provide a control system which, as the airplane climbs above about 8,000 ft., will hold the internal cabin pressure substantially constant at the normal pressure level for 8,000 ft., but which, when the plane reaches some predetermined higher elevation, say about 30,000 ft., will then allow the cabin pressure to fall with further increase in airplane altitude, so that the differential of pressures internally and externally of the cabin will never exceed a given safety value.

The general object of the present invention is to provide a control system capable of accomplishing the above described results with surety and effectiveness, and which is at the same time characterized by avoidance throughout of complicated and expensive structure and mechanism.

The system of the present invention will be described in detail in several typical illustrative forms, in the course of which additional objects and the various features and accomplishments of the invention will be made apparent. For this purpose reference is had to the accompanying drawings, in which:

Fig. 3 is another graph showing a modified type of operation in accordance with the invention;

Fig. 4a is an enlarged view of a portion of Fig. 4;

Fig. 4b is a section on line 4b—4b of Fig. 4a;

Fig. 4c is an enlarged view of a portion of Fig. 4;

Figure 2:
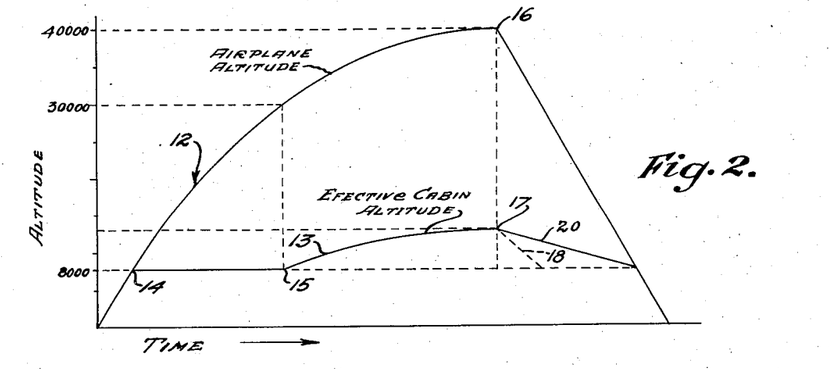
Fig. 2 is a graph illustrating the operation of my control system.

Reference is first directed to Fig. 2, which is a graph showing the relation between aircraft altitude and the desired "effective altitude" within the cabin as the aircraft rises to an elevation of 40,000 ft., and then descends to sea level. The curve 12 represents the actual altitude of the aircraft above sea level. Owing to supercharging of the cabin above some arbitrarily fixed altitude, usually above 8,000 ft., the cabin interior above that altitude is at a pressure higher than outside pressure, and the curve 13 of Fig. 2 represents the "effective" cabin altitude, i. e., the altitude that corresponds to the interior cabin pressure. Thus whereas the aircraft may be at a given high altitude, the occupants of the cabin will experience a pressure condition corresponding to some lesser altitude. The two curves 12 and 13 of Fig. 2 thus represent, respectively, the actual altitude of the plane, and the effective cabin interior altitude, or altitude which would correspond to the actual pressure conditions maintained within the supercharged cabin. Reference to Fig. 2 will show that whereas the aircraft gains altitude along such a curve as is represented at 12, the effective cabin altitude ceases to increase at an altitude of about 8,000 ft., this point being indicated at 14, and remain substantially constant until the aircraft has reached an altitude of about 30,000 ft. (point 15 on curve 13). The effective cabin interior altitude thus follows curve 12 to point 14 (8,000 feet), and then remains substantially constant while the aircraft is rising to about 30,000 ft. By this time, however, there is a substantial differential as between the pressures existing internally and externally of the cabin, and in order to avoid undue bursting strains, it becomes desirable to thereafter permit the cabin pressure to fall with further fall of outside pressure. In other words, in terms as represented in Fig. 2, the effective altitude of the cabin interior is allowed to increase with further climb of the aircraft above an altitude here arbitrarily taken to be 30,000 ft. In accordance with the invention, therefore, the pressure differential internally and externally of the cabin should, preferably, be held constant above 30,000 ft. Because of the logarithmic relation between barometric pressure and altitude, however, a constant differential between actual airplane altitude and effective cabin altitude will not be maintained, the effective cabin altitude not increasing as rapidly as airplane altitude, as is indicated between points 15 and 17 on curve 13 in Fig. 2.

As the aircraft descends, as from point 16 to sea level (see Fig. 2), the effective cabin interior altitude may also be permitted to fall. This effective cabin interior altitude may be allowed to follow from the point 17 of maximum altitude along the dotted line 18, in such a way as to preserve the arbitrarily selected maximum differential of internal and external cabin pressure constant until the an effective cabin pressure corresponding to elevation of 8,000 ft. is reached, after which the internal cabin pressure would remain constant until the aircraft is also down to 8,000 ft. as indicated. When the aircraft dives sharply from a high altitude, however, the rapid increase of pressure produces uncomfortable and disturbing physiological effects and these may be reduced somewhat by causing the effective cabin altitude to fall less sharply along such a modified line as is indicated at 20, the cabin altitude and the aircraft altitude reaching the 8,000 ft. level simultaneously, as indicated. Below this level, the aircraft and effective cabin interior altitude are substantially equal.

Figure 1:
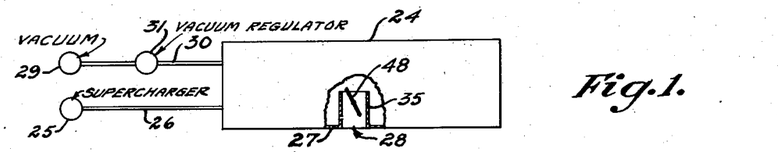
Fig. 1 is a diagram of an airplane cabin, to which is connected a supercharger for introduction of pressure air, and a source of vacuum for operation of the control system.
Figure 4:
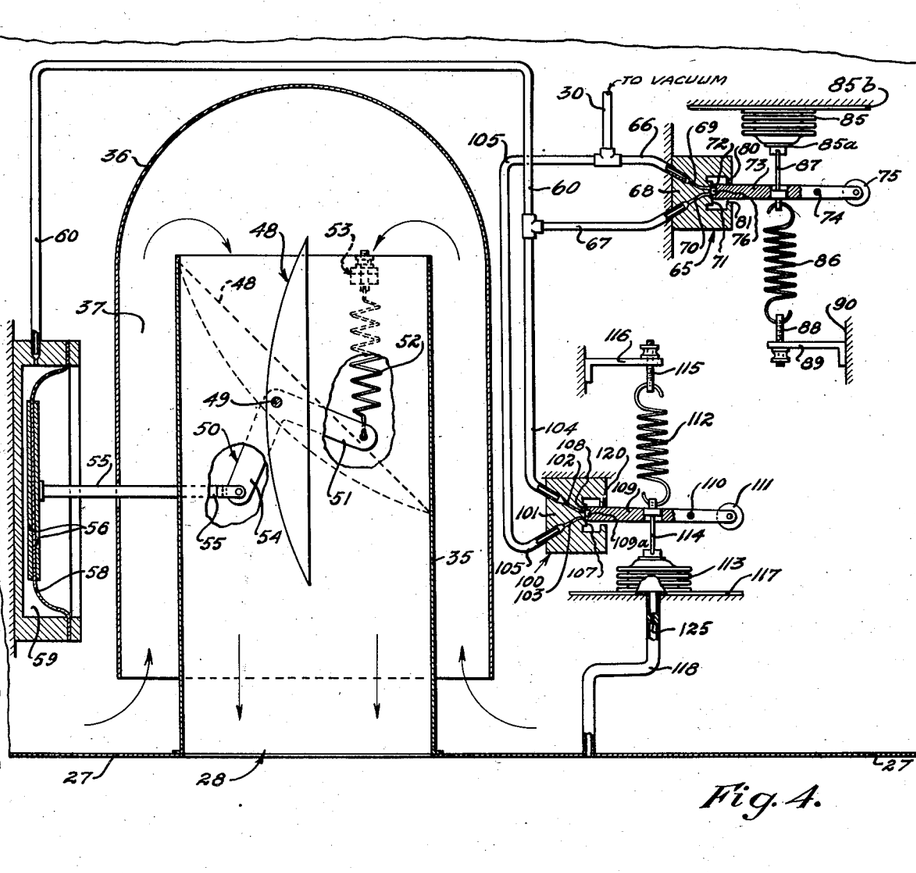
Fig. 4 is a diagrammatic view of a preferred form of control system in accordance with the invention.

Reference now being directed to Figs. 1 and 4, numeral 24 indicates diagrammatically the cabin of an aircraft, equipped with supercharger 25 and incoming air pressure line 26. Numeral 27 designates generally a wall of the cabin structure, which is furnished with an air outlet 28 controlled by a valve 48. An air pressure system is provided for operating the valve 48, and while within the broad scope of the invention this system might be operated by air at a pressure either above or below atmospheric pressure, I here show the case of a system operated by air at sub-atmospheric pressure. A vacuum source is accordingly designated generally in Fig. 1 at 29, and this source, which is connected into the cabin by a vacuum line 30, may be either a vacuum pump or any suitable source of vacuum such as the intake manifold of an engine of the aircraft. The vacuum should be regulated to within close limits, and this may be accomplished through use of any suitable vacuum regulator 31 in line 30, a suitable example of which is shown in my copending application, Ser. No. 346,668, filed July 20, 1940, entitled Vacuum regulator for air driven aircraft instruments. With the use of such a regulator, a substantially constant source of vacuum is afforded, as will be obvious. In such a case, the actual source 29 taken together with the regulator 31 may be taken together as a source of substantially constant vacuum.

Air outlet 28 is defined by a tubular member 35 mounted in and extending inwardly from cabin wall 27. This tubular member 35 is surrounded by a bell-jar shaped member 36, the latter being annularly spaced from tubular member 35 so as to provide an annular air passage 37, and its open end being spaced from cabin wall 27 to provide for air passage therebetween, as illustrated. Thus there is formed an air exhaust passageway leading from the cabin interior upwardly between members 35 and 36, and thence downwardly through member 35 to be exhausted to atmosphere. This particular form of air outlet has the advantage that it forms a muffler against incoming noise, and has the further advantage that heat from the air rising through annular passageway 37 warms outlet tubular member 35, and thereby reduces the tendency for ice to form at the discharge end of the exhaust tube 35.

Mounted in tubular member 35 is the valve 48, preferably and here shown as a butterfly valve, which is here shown as carried by a shaft 49 rotatably mounted in tubular member 35 and which has on one end a bell crank 50. To one arm 51 of bell crank 50 is connected one end of a tension spring 52, the other end of which is anchored to a suitable supporting means, as indicated at 53. To the other arm 54 of bell crank 50 is connected one end of a link 55, the other end of which is connected to the center of a pair of disks 56 between which is clamped a flexible diaphragm 58. Flexible diaphragm 58 defines one side of a closed vacuum chamber 59, its outer surface being exposed to interior cabin pressure, and communicating with chamber 59 is a vacuum conduit 60. As appears in Fig. 4, spring 52 and bell crank 50 are so arranged that butterfly valve 48 is urged to move to the closed, dotted line position by spring 52, while movement of diaphragm 58 in a direction toward the left, as viewed in the figure, moves valve 48 toward fully open position, shown in full lines in the figure.

Vacuum line 60 is connected to the aforementioned vacuum source 29 via a control valve 65, lines 66 and 67, and the aforementioned vacuum line 30.

Preferably, and as here embodied, the valve 65 includes a member 68 having air passages 69 and 70, connected to vacuum lines 66 and 67, respectively, and opening in relatively close spaced positions through a surface 71 swept at close working clearance by the end 72 of a pivoted valve plate 73. Valve plate 73 is pivotally mounted on any suitable support at 74, and is preferably counterweighted as indicated at 75. The end 72 of valve plate 73 is formed with an air passage groove or depression 76, the height of which is substantially equal to the center to center spacing of air passages 69 and 70 at point of opening through surface 71. The groove 76 serves to pass air from one of said passages to the other. In the valve position illustrated in full lines in Fig. 4a, maximum flow from passageway 70 through groove 76 to passageway 69 is permitted, both of the passageways being open substantially half their maximum area. In this position the valve plate 73 is against a stop 80. As the valve plate thereafter moves away from stop 80 and toward a second stop 81, its end 72 gradually closes the passageway 69, said passageway being completely closed by the time the valve plate has reached the position indicated in dotted lines in Fig. 4a.

Valve plate 73 is under the control of a tension spring 86 and an aneroid device or exhausted expansive chamber 85 exposed externally to interior cabin pressure, preferably and here shown as in the form of an exhausted bellows mounted at one end on any suitable fixed support 85b within the cabin. As indicated in Fig. 4, the movable end 85a of bellows 85 is connected by a band 87 with pivoted valve plate 73 at a point located between pivot 74 and valve end 72. The tension spring 86, here shown as connected to valve plate 73 at a point in line with band 87, urges valve plate 73 to move in a direction from bellows 85, and is shown as anchored by means of tension adjustment screw 88 to a bracket 89 mounted on any suitable fixed support 90.

The valve plate 73 is against stop 80 at all times that the pressure outside the bellows is above a value corresponding to atmospheric pressure at some definite altitude. Below such altitude, therefore, the bellows is held against cabin pressure in a somewhat elongated or stretched condition by the engagement of the plate 73 against stop 80. At and above the stated altitude, the cabin pressure becomes sufficiently low so that the bellows expands to a length sufficient to cause separation of valve plate 73 from stop 80. The tension exerted by spring 86 determines the exact cabin pressure at which the bellows will begin to elongate beyond its first described length (that at which plate 73 contacts stop 80), since the effect of the pressure of the cabin air acting inwardly on the bellows is balanced partly by the partially compressed bellows itself and partly by the spring 86. Adjustment of spring 86 accordingly regulates the air pressure point at which the bellows will begin to elongate, and the valve plate 73 will begin to separate from stop 80. This adjustment is preferably made such that the bellows will begin to elongate at an airplane altitude of about 8,000 ft.

The operation of the system as so far described may now be understood. The plane being at ground level, pressure conditions internally and externally of the cabin are substantially equal and the aneroid bellows 85 is held contracted by atmospheric pressure against the force of spring 86 and the resistance of the bellows itself to the extent permitted by the valve stop 80, so that the air passage from passageway 69 through to passageway 70 is open to the maximum extent possible. At this time maximum suction from line 30 is therefore communicated via line 66, valve 65, line 67 and line 60 to chamber 59, so that the pressure in the latter is reduced to maximum extent, and diaphragm 58 is at its extreme left hand position, with butterfly valve 48 in its fully open position. As the airplane then climbs, and the pressure both within and without the cabin falls accordingly, the compressive pressure of the cabin air on bellows 85 gradually decreases. Below 8,000 ft., however, the pressure acting on the bellows maintains the latter at a length such that valve plate 73 remains against stop 80, the collapsing force of the cabin air remaining more than sufficient to overbalance the resistance of the bellows plus that of the spring 86. But at about 8,000 ft., depending upon the adjustment of spring 86, the pressure of the air has lowered sufficiently so that the bellows 85, under the influence both of its own compression and the tension of spring 86, begins to elongate, the valve plate 73 hence moving in a direction away from stop 80, i. e., toward the dotted line position of Fig. 4a. This closes down vacuum passageway 69, and allows the pressure in diaphragm chamber 59 to increase. The inward pull on the diaphragm being thus lessened, spring 52 is enabled to move valve 48 a certain distance toward closed position, depending upon the amount by which the pressure in the diaphragm chamber is increased. The position of valve 48 is thus determined at any given time by the opposing forces exerted by spring 52 and the diaphragm 58 on the two arms of bell crank 50, the valve coming to rest in a position at which the differential of forces exerted on the diaphragm and transmitted to the bell crank is just balanced by spring 52. Thus valve plate 48 moves from the fully open, full line position of Fig. 4 toward the closed dotted line position in accordance with the movement of valve plate 73 from the full line toward the dotted line position of Fig. 4a. The bellows 85, varying in length in response to changes in interior cabin pressure above an airplane altitude of 8,000 ft., then automatically governs the valve 65 to control the position of air outlet valve 48 in such a manner as to hold the interior cabin pressure constant as the airplane climbs above 8,000 ft.

As the airplane climbs substantially above 8,000 ft., the pressure differential internally and externally of the cabin finally becomes quite large for the structural strength of the cabin, and it therefore becomes desirable to permit interior cabin pressure to then fall with further increase in altitude. Therefore, in accordance with the preferred form of the present invention, there is provided a valve device, generally designated at 100 in Fig. 4, which automatically comes into operation at a predetermined pressure differential and prevents further increase in pressure differential. This may be set to occur at about 30,000 ft. The valve device 100 is somewhat similar to the previously described valve device 65. It comprises a member 101 having air passages 102 and 103 communicating via lines 104 and 105 with vacuum lines 60 and 30, respectively. The air passages 102 and 103 open in relatively close spaced positions through surface 107 swept at close working clearance by the end 108 of a pivoted valve plate 109 which is constructed like valve plate 73. This valve plate 109 is pivotally mounted on a suitable support at 110, and is counterweighted as indicated at 111. On opposite sides of valve plate 109 are a tension spring 112, and a metallic bellows 113, one end of spring 112 and a band 114 secured to the movable end of bellows 113 being connected with valve plate 109 at points between pivot 110 and valve end 108. Spring 112 is anchored by means of tension adjustment screw 115 to any suitable support such as 116, and the fixed end of bellows 113 is mounted inside the cabin on a support 117. The interior of the bellows 113 is in communication via a conduit 118 with outside atmosphere, the conduit 118 opening through cabin wall 27 as indicated.

Figures 3, 4A, 4B, 4C:
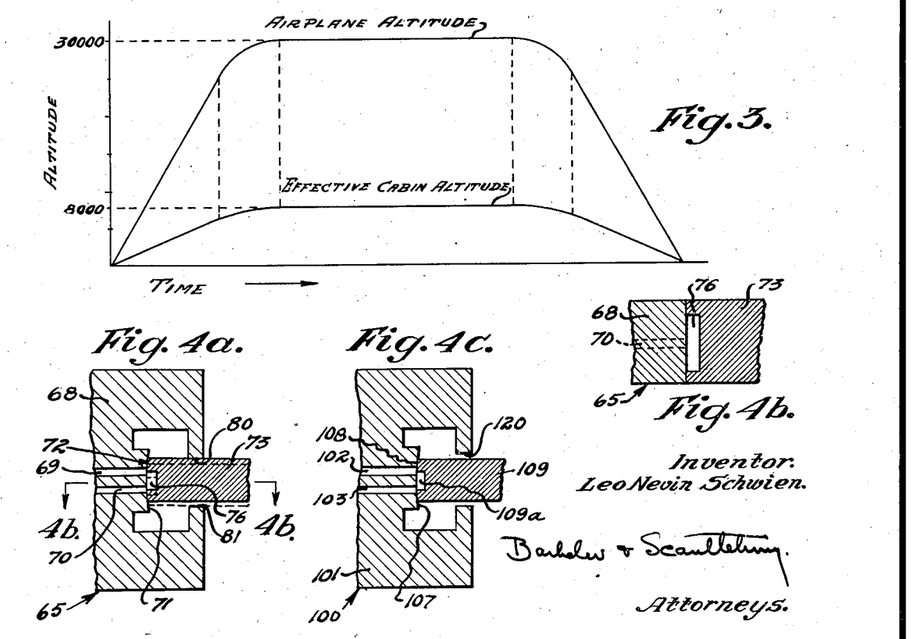

Below an altitude of 8,000 ft., or in other words below the point at which supercharging of the cabin is initiated, the pressures inside and outside of bellows 113 are substantially the same, and the valve plate 109 is held against stop 120 by means of spring 112. In such position, passageway 102 is open to groove 109a in the end 108 of valve plate 109, but the passageway 103 is closed by the end of the valve plate, as will be evident. Climbing above 8,000 ft., the pressure outside the cabin continues to fall, but by reason of the operations previously described the interior cabin pressure holds constant and the increasing differential of pressures inside and outside the bellows 113 causes said bellows to contract against the restraint of spring 112. Eventually, in the further climb of the plane above 8,000 ft., the differential of pressures externally and internally of bellows 113 is sufficient that the spring restrained valve plate 109 is pulled downwardly by the bellows to some such a position as illustrated in Fig. 4c, in which communication is established between valve passageways 102 and 103 via the valve groove 109a. This occurrence, which is preferably arranged to take place at a pressure differential internally and externally of the cabin of about 6.25 pounds per square inch, and which in the present instance corresponds to an altitude of about 30,000 ft., establishes communication from vacuum source line 30 to diaphragm chamber 59 via the line 105, the valve 100 and the line 104, so that the vacuum in chamber 59 is increased and diaphragm 58 moves further inwardly, or toward the left, and outlet valve 48 is opened somewhat, allowing interior cabin pressure to fall correspondingly. This brings about further extension of aneroid bellows 85, which moves valve plate 73 to interrupt the supply of vacuum to diaphragm chamber 59 via the control valve 65. Valve plate 73 may at this time move against its stop 81. Thereafter, that is, at altitudes above 30,000 ft., air discharge valve 48 is under the sole control of the valve 100, which is in turn under the control of the differential of pressures internally and externally of the cabin, and automatically seeks a position maintaining the differential of pressures internally and externally of the cabin at a predetermined maximum, which is established by the tension initially given to spring 112.

In the descent of the plane, the valve plate 109 returns to the position of Fig. 4 and the valve plate 73 lifts above the dotted-line vacuum cutoff position of Fig. 4a as the 30,000 ft. level is reached, so that the internal cabin pressure is again under the exclusive control of valve 65, and is maintained thereby at a constant value equivalent to atmospheric pressure at 8,000 ft. As the plane then reaches the 8,000 ft. level, the valve plate 73 returns to the position of Fig. 4, thereby opening wide the vacuum supply to diaphragm chamber 59, and causing the diaphragm to move inwardly and open wide the air outlet valve 48. Pressures internally and externally of the cabin are thus substantially equalized as the plane descends below 8,000 ft.

As a preferred feature, I may provide a restricted orifice 125 in the conduit 118 that establishes communication between bellows 113 and the outside atmosphere. In the case of a steep dive from an altitude above 30,000 ft., this restricted orifice has the effect of retarding the air flow into bellows 113, and therefore the increase of cabin pressure, so that the cabin pressure may increase along the line 20 of Fig. 2, and may not rise to a value corresponding to an altitude of 8,000 ft. until substantially the time the plane reaches the 8,000 ft. level. This of course partially relieves the occupants of the plane of the disturbing physiological sensations resulting from dives throughout the range from above 30,000 ft. down to 8,000 ft. whenever the dive starts from above 30,000 ft.

Figures 5, 5A:
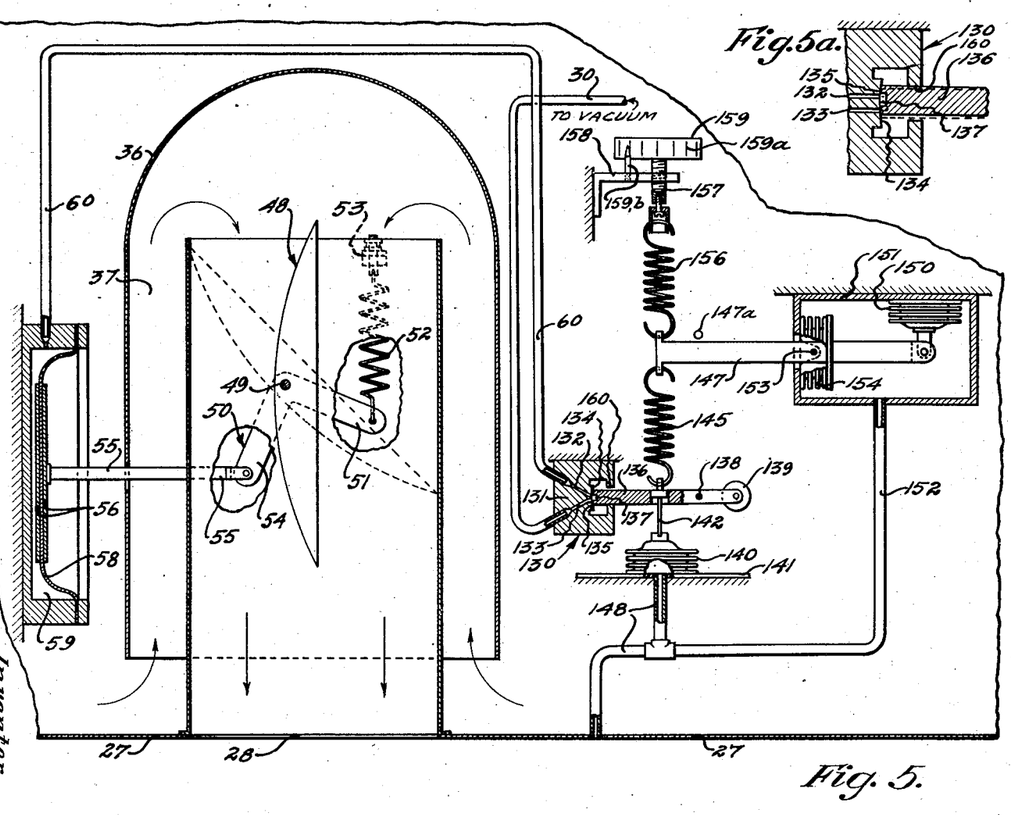
Fig. 5 is a diagrammatic view of a modified control system in accordance with the invention.
Fig. 5a is an enlarged view of a portion of Fig. 5.

Fig. 5 shows a modified system having modified operating characteristics represented by the graph of Fig. 3. In the type of operation represented by the graph of Fig. 3, the interior cabin pressure does not fall with outside atmospheric pressure up to an arbitrary altitude level such as 8,000 ft., as in Fig. 2, but falls at a lesser rate than outside atmospheric pressure, starting to fall as the plane rises from ground level. Thus as the plane rises, the interior cabin pressure constantly falls, but at a lesser rate than outside or atmospheric pressure, so that the pressure differential of internal and external pressures increases with plane altitude. The reverse occurs as the plane descends, as indicated by the graph. This type of operation, which gives the passengers a longer time period within which to accommodate themselves to change of altitude, is particularly desirable for passenger transport service.

Fig. 5 again shows somewhat diagrammatically a fragmentary portion of the cabin, including the air discharge outlet, discharge outlet control valve, and diaphragm chamber, all arranged the same as in the system of Fig. 4, and corresponding parts of the two systems being identified by similar reference numerals. A control valve 130 is employed, which may be exactly like the control valve 100 of Fig. 4, and comprises a member 131 having air passages 132 and 133 opening in close spaced positions through surface 134 swept by the end 135 of pivoted valve plate 136. Valve plate 136, which has air passage groove 137 in its forward end 135, is pivotally mounted on a suitable support at 138, and is counterweighted at 139. The air passageway 132 has connected thereto the vacuum chamber line 60, and the air passageway 133 has connected thereto the vacuum source line 30.

A bellows 140, corresponding to the bellows 113 of Fig. 4, is mounted on a fixed support 141 and has its movable end connected by means of a band 142 to valve plate 136 at a point between pivot 138 and valve end 135, and a tension spring 145, corresponding to spring 112 of Fig. 4, is connected at one end to valve plate 136, in line with band 142, and at the other end to one end of a pivoted tension regulating beam 147. The bellows 140 communicates with outside atmosphere via a conduit 148 opening through cabin wall 27.

The valve 130, under the control of spring 145 and the bellows 140, will operate similarly to the valve 100 of Fig. 4 to create a differential of pressure inside and outside the cabin depending upon the spring tension exerted upon it. In the system of Fig. 5, however, the spring tension is increased as the airplane gains altitude, and the differential of pressure inside and outside the cabin increases accordingly. The present illustrative means for accomplishing this increase in spring tension with increasing altitude includes an aneroid bellows 150 mounted on a wall of a chamber 151, which chamber is in communication with outside atmosphere via tubing 152 connected into tubing 148. The movable end of aneroid bellows 150 is connected to the end of beam 147 opposite to that to which the spring 145 is connected, and the beam is furnished with a pivotal mounting 153 just inside chamber 151, as indicated, a bellows 154 sealing the opening in chamber 151 through which the beam projects. As here shown, a second tension spring 156 is connected between the end of beam 147 and a tension adjustment screw 157 threaded in fixed support 158. As here shown, screw 157 has an enlarged head 159 having a scale 159a on its periphery, which scale is provided with a fixed indicator 159b.

The tension of spring 156 is adjusted at ground level so as just to balance against bellows 150, the spring 145 holding valve plate 136 against stop 160, but preferably being untensed. In this valve position the vacuum source is cut off from diaphragm chamber 59 (see full line position, Fig. 5a), and the spring 52 therefore holds air outlet valve 48 in closed position. Pressure inside the cabin accordingly rises above outside atmospheric pressure, with the result that bellows 140 contracts and causes valve plate 136 to move downwardly against springs 145 and 156 to such a position for instance as illustrated in dotted lines in Fig. 5a, so that vacuum line 30 is in communication with line 60 and diaphragm chamber 59. The pressure in diaphragm chamber 59 is accordingly reduced, and the diaphragm 58 moves valve 48 toward open position. The exact position assumed by valve plate 136 and the outlet valve 48 will now depend upon the tension of springs 145 and 156, the system operating automatically to establish some definite differential of pressure internally and externally of the cabin, which however may be very small because of the absence of substantial initial tension in the springs, particularly in spring 145. As the airplane then rises, outside atmospheric pressure falls, and this atmospheric pressure being communicated to chamber 151, aneroid bellows 150 elongates, and moves beam 147 to increase the tension exerted by spring 145 on valve plate 136. This moves plate 136 in the direction of its stop 160, closing down the air passageway through valve 130, and therefore decreasing the vacuum in diaphragm chamber 59, which permits valve 48 to close somewhat, and the pressure differential internally and externally of the cabin to increase accordingly. Thus, whereas the valve device 100 of the system of Fig. 4 operates to produce a constant differential of pressure internally and externally of the cabin, the valve device 130 of the system of Fig. 5 operates to produce differentials of pressure inside and outside the cabin which increase with increasing altitude. Except at take-off, when internal cabin pressure is equal to or only very slightly above atmospheric pressure, internal cabin pressure is always higher than outside atmospheric pressure, and the differential increases with the altitude of the airplane. Or, as represented in Fig. 3, the "effective altitude" of the cabin is always less than the actual altitude of the plane, and the higher the altitude of the plane, the greater is the difference between actual plane altitude and effective cabin altitude.

As stated before, the spring tension exerted on the control valve plate 136 is adjusted before take-off for zero differential of pressures internally and externally of the cabin for the altitude of the take-off point above sea level. In the descent of the plane, the differential of pressures internally and externally of the cabin will again reach zero or substantially zero at that same take-off altitude. However, it may be that the landing field will be at some different altitude. For example, whereas the take-off field might be at sea level, the landing field might be at an altitude of say 6000 ft. above sea level, in which case there would still be a very substantial differential of pressures internally and externally of the cabin after landing. This undesirable condition may be obviated by adjustment of the spring tension exerted on the valve plate while the plane is in flight, the adjustment being made by means of the above described tension adjustment screw 157. To facilitate the adjustment, the scale 159a on the head of screw 157 may be calibrated in terms of take-off and landing field altitude. Thus, assuming the plane to be in flight, and the altitude of the landing field to be known, proper spring tension for zero differential of pressures internally and externally of the cabin for that landing field altitude may be set by means of screw 157, the adjustment being made with the aid of scale 159a on the head of screw 157 and the indicator 159b. If this tension adjustment be properly made, the differential of pressure internally and externally of the cabin will be substantially zero when the plane reaches the landing field. The system as described thus involves a manual adjustment of the spring tension exerted on the valve for the altitude at which the plane is to land, and this adjustment is made while the plane is in the air. Of course, the adjustment having been properly made for a given landing field altitude, that same adjustment will then be proper to establish a zero differential of pressures at time of subsequent take-off.

The system of Fig. 5 has the general advantage that pressure conditions inside the cabin are always held above outside atmospheric pressure conditions, and particularly that pressure changes within the cabin are more gradually made than the change in outside atmospheric pressure as the plane climbs or descends, and this holds true from ground level rather than from a beginning point at some predetermined altitude above ground level.

The system of Fig. 5 may be provided with means limiting the maximum differential of pressures internally and externally of the cabin to any predetermined maximum; this may be done in several ways, such as by the provision of a stop 147a adapted to be engaged by and thus limit the movement of the beam 147, or by the provision of a spring loaded relief valve (not shown), of any conventional or suitable character, arranged to bleed air from the cabin when some predetermined maximum pressure differential is achieved.

Figure 6:
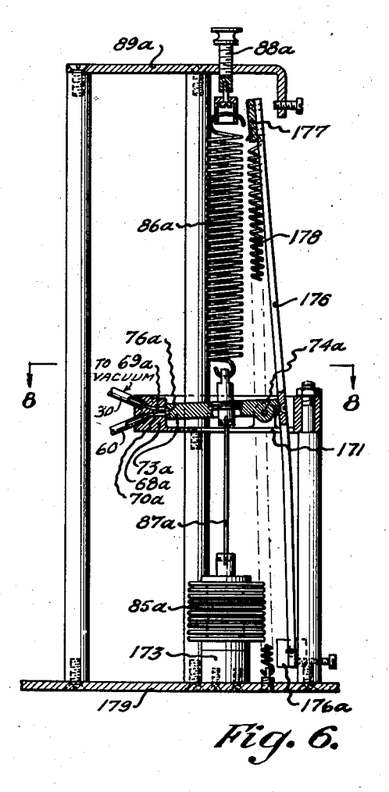
Fig. 6 shows an improved form of valve actuating device, such as may be incorporated in the systems of Figs. 4 or 5 with beneficial effect, Fig. 6 being a section taken on line 6—6 of Fig. 7.
Figure 7:
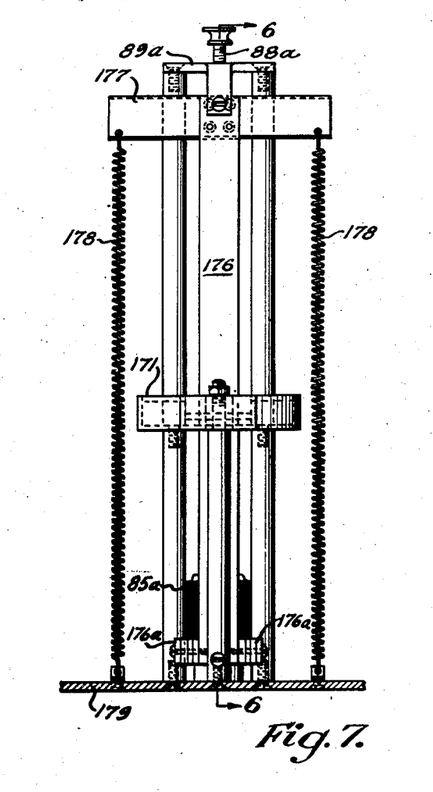
Fig. 7 is a side elevation of the device of Fig. 6, being a view looking toward the device of Fig. 6 from the right.
Figure 8:
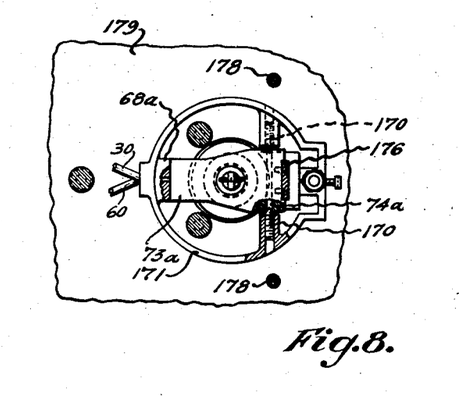
Fig. 8 is a section taken on line 8—8 of Fig. 6.

In the illustrative systems of Figs. 4 and 5, the positions of valve plates 73, 109 and 136 vary with the pressures exerted by the respective bellows, the position assumed in each instance being that in which the spring balances the force exerted on the valve plate by the bellows. In the simple diagrammatically illustrated arrangements of Figs. 4 and 5, relatively small changes in force exerted by the bellows produce relatively small deflections of the valve springs and of the valve plates, unless springs of considerable length (low spring constant) are used. In order to secure a greater spring deflection, and therefore a greater movement of valve plate, for a given change of bellows pressure, without resorting to springs of undue length, the spring system of Figs. 6, 7 and 8 may be employed. The device of Figs. 6 through 8 is shown in a mechanical form designed for control of the valve 65 of Fig. 4, but it will be understood that the same system may be employed in connection with the valve device 100 of Fig. 4, with its spring 112 and bellows 113, or the valve device 130 of Fig. 5, with its spring system 145, 156 and bellows 140. In Figs. 6 through 8, the valve plate is designated at 73a, pivotally mounted at 74a on trunnions 170 supported by a frame 171 that also supports the member 68a in which the vacuum passageways 69a and 70a are formed. The forward end of valve plate 73a is shown to have air passage groove or depression 76a, all corresponding to the arrangement diagrammed in Fig. 4.

Tension spring 86a is connected at one end to valve plate 73a, and at the other end to tension adjustment screw 88a mounted in support 89a. Bellows 85a, mounted on support 173, has its movable end connected to valve plate 73a by means of band 87a. Secured to valve plate 73a just rearwardly of pivot 74a is a beam 176. This beam 176, which extends substantially at right angles to valve plate 73a, carries at the top a cross piece 177, to opposite ends of which are connected the upper ends of tension springs 178. The lower end of the beam 176 is counterweighted, as at 176a. The lower ends of springs 178 are connected to frame structure 179 at points below bellows 85a. The center lines, or lines of action, of these springs 178 are just to one side or the other of the axis of valve plate pivot 74a, being here shown as inside said axis so that the tendency of the springs is to move the plate 73a in a direction corresponding to the direction of extension of spring 86a. In other words, the springs 178 are here shown as acting in opposition to spring 86a, though this is not essential as will later appear. Now, if the differential of pressures internally and externally of the bellows should change, such as to cause a change in the force exerted by the bellows, the length of spring 86a will change accordingly, and this change in length of spring 86a will be increased by the action of the springs 178. Assume, for example, a contraction of bellows 85a, and a corresponding extension of spring 86a, so that the valve plate rocks in a counter-clockwise direction, as viewed in Fig. 6. Such movement of the valve plate will substantially increase the relatively short lever arm of springs 178, or in other words, the perpendicular distance between their lines of action and the pivot axis of the valve plate. The moment of the springs 178 acting to cause counter-clockwise rotation of the valve plate is therefore substantially increased, and the movement of the plate is magnified accordingly. The springs 178, in effect, lower the spring constant of the system, magnifying the deflection of the movable members resulting from change of force exerted by the bellows. If the lines of action of the springs 178 passed outside the pivot axis of the plate 73a, the springs 178 would then act with rather than against the springs 86a, but in such a case the moment of the springs 178 would be decreased rather than increased, so that the result would again be an increase in counter-clockwise moment, and increased movement of the valve plate. The springs 178 must of course be adjusted to a proper tension to accomplish the compensation desired. They must not, of course, be under sufficient tension relatively to the tension of spring 86a as to unstabilize the system.

Figure 9:
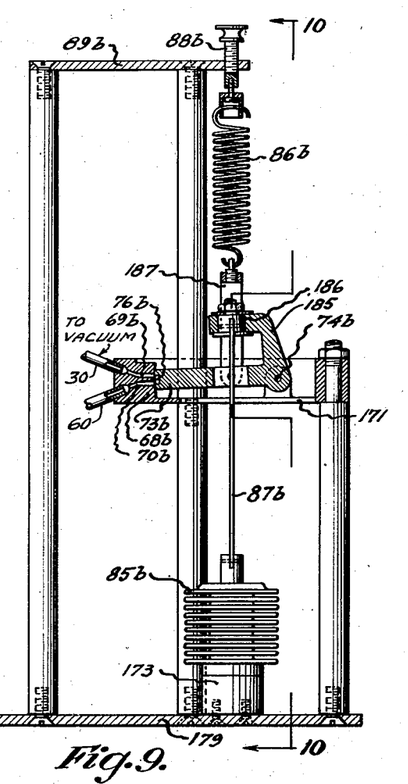
Fig. 9 is a modification of the device shown in Figs. 6 to 8, being a view taken on line 9—9 of Fig. 10.
Figure 10:
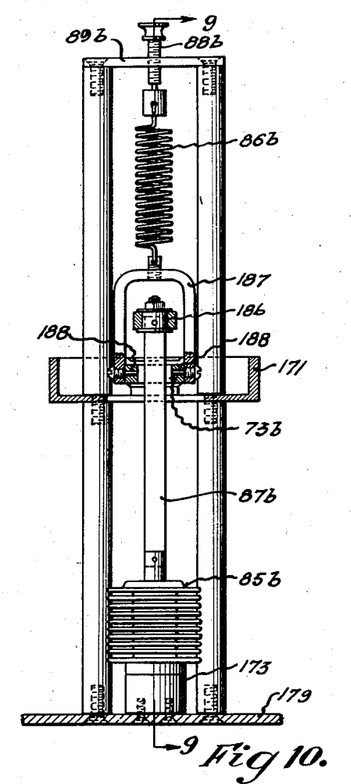
Fig. 10 is a section taken on broken line 10—10 of Fig. 9.

Figs. 9 and 10 show a modified means for magnifying the deflection of the spring for a given change in bellows pressure, applicable again to any of the valves 65, 100 or 130. The valve device in this instance is in general respects similar to the device of Figs. 6, 7 and 8, and corresponding parts are for convenience identified by similar reference numerals, but with the sub letter b used in the case of Figs. 9 and 10. In the device of Figs. 9 and 10, the band 87b connecting bellows 85b with the valve plate 73b is attached to an arm 185 projecting from the pivot end of plate 73b and spaced somewhat on the opposite side of said plate from the bellows. As here shown, the band is connected in any suitable manner with a stud 186 mounted in arm 185, the effective connection point between the band 87b and the arm 185 being located along a line extending radially from pivot 74b at about 45° from the plane of the valve plate 73b. Tension spring 86b is connected to valve plate 73b by means of a stirrup 187 which straddles arm 185 and is pivotally connected to opposite edges of valve plate 73b as at 188.

Now since the connection point between the bellows band 87b and the valve structure 73b, 185 is rotated 45° about the pivot axis of the latter from the plane of the plate 73b, said point will have a component of movement parallel to said plane which is as great as its movement at right angles to said plane in the operation of the system. On the other hand, the connection point between the spring stirrup 187 and the valve structure 73b, 185 being in the plane of the plate 73b, will have no material component of movement parallel to said plane. Therefore, as the force exerted by the bellows 85b on the valve structure 73b, 185 changes, and said valve structure and the spring 86b deflect accordingly, there will be a like variation in the lever arm distance at which the bellows acts on the valve structure, that is, in the perpendicular distance between band 87b and the axis of pivot 74b, whereas the lever arm distance of the spring 86b acting on valve plate 73b will not be materially affected. The result is that any movement of the system initiated by deflection of the bellows is magnified. For example, assuming the pressure externally of the bellows to decrease, the bellows will elongate and permit movement of the valve plate 73b and spring 86b in a direction from the bellows. Such rocking action of the pivoted valve structure shortens the lever arm of the bellows, and thus decreases the moment exerted by the bellows on the structure, and permits the system to deflect to increased extent under the action of the spring 86b, whose lever arm has not been correspondingly modified.

The spring system of Figs. 6, 7 and 8 and the off-set arm system of Figs. 9 and 10 are thus both designed to accomplish a result which is in effect the equivalent of use of a valve spring of lowered spring constant, this being the gain of a relatively large range of valve plate movement for a relatively small range of varying bellows pressures.

It will be understood that the drawings and description are illustrative of rather than restrictive on the invention, and that various changes in design, structure and arrangement may be made without departing from the spirit and scope of the invention or of the appended claims.

I claim:

1. In a control system for a supercharged aircraft cabin having an air outlet: a movable valve controlling said outlet, a vacuum supply line, vacuum controlled means connected to said line adapted to operate said valve, a vacuum control valve in said vacuum supply line, a spring for urging said vacuum control valve to move in a direction to effect operation of said vacuum controlled means causing closing movement of said air outlet valve, and an aneroid device acting on said vacuum control valve in opposition to said spring, said aneroid device being exposed to internal cabin pressure, and being ineffective to cause movement of said vacuum control valve in response to fall of cabin pressure until a predetermined pressure level is reached, but being responsive at and below said predetermined pressure to support said vacuum control valve against said spring at positions in which the air outlet valve maintains the internal cabin pressure approximately constant at said predetermined level.

2. In a control system for a supercharged aircraft cabin having an air outlet: a movable valve controlling said outlet, a vacuum supply line, vacuum controlled means connected to said line adapted to operate said valve, a vacuum control valve in said vacuum supply line, a spring for urging said vacuum control valve to move in a direction to effect operation of said vacuum controlled means causing closing movement of said air outlet valve, and an exhausted expansive chamber exposed to cabin interior pressure and having a movable wall operatively coupled to said vacuum control valve so as to act thereon in opposition to said spring.

3. In a control system for a supercharged aircraft cabin having an air outlet: a movable valve controlling said air outlet, a source of substantially constant vacuum, vacuum controlled means for operating said valve, and means responsive to the differential of pressures internally and externally of the cabin for governing application of vacuum from said source to said vacuum controlled means.

4. In a control system for a supercharged aircraft cabin having an air outlet: a movable valve controlling said air outlet, a vacuum supply line, vacuum controlled means connected to said line adapted to operate said valve, a control valve in said vacuum supply line, a spring for urging said control valve to move in a direction to effect operation of said vacuum controlled means causing closing movement of said air outlet valve, and means responsive to the differential of pressures internally and externally of the cabin and operatively coupled to said control valve to act thereon in opposition to said spring.

5. In a control system for a supercharged aircraft cabin having an air outlet: a movable valve controlling said outlet, a vacuum supply line, vacuum controlled means connected to said line adapted to operate said valve, said vacuum controlled means operating to open said valve with increasing vacuum application thereto, a control valve in said vacuum supply line, a spring for urging said control valve to move toward closed position, an exhausted expansive chamber exposed to cabin interior pressure having a movable wall operatively connected to said control valve and acting on said control valve in opposition to said spring, all so arranged that expansion of said chamber permits said spring to move said control valve toward closed position, means supporting said chamber against contraction by cabin air pressure beyond a dimension corresponding to its normal dimension for atmospheric pressure at a predetermined altitude, a control valve connected in said vacuum line in parallel with said first mentioned control valve, a spring for urging said last mentioned control valve to move toward closed position, an expansive chamber exposed externally to cabin interior pressure and internally to outside atmospheric pressure, said last mentioned chamber having a movable wall operatively connected to said last mentioned control valve and acting on said last mentioned control valve in opposition to said spring, said last mentioned chamber moving said last mentioned control valve against its said spring from closed to partially open position when subjected interiorly to an atmospheric pressure corresponding to a predetermined altitude above said first mentioned predetermined altitude.

6. In a control system for a supercharged aircraft cabin having an air outlet: a movable valve controlling said air outlet, a vacuum supply line, vacuum controlled means connected to said line adapted to operate said valve, a control valve in said vacuum supply line, a spring for urging said control valve to move in a direction to effect operation of said vacuum controlled means causing closing movement of said air outlet valve, and an expansive chamber exposed externally to cabin pressure and internally to outside atmospheric pressure, said chamber having a movable wall operatively coupled to said control valve to act thereon in opposition to said spring, and means for increasing the pressure exerted by said spring on said control valve with decrease in external atmospheric pressure.

7. In a control system for a supercharged aircraft cabin having an air outlet: a movable valve controlling said air outlet, a vacuum supply line, vacuum controlled means connected to said line adapted to operate said valve, a control valve in said vacuum supply line, a spring for urging said control valve to move in a direction to effect operation of said vacuum controlled means causing closing movement of said air outlet valve, and an expansive chamber exposed externally to cabin pressure and internally to outside atmospheric pressure, said chamber having a movable wall operatively coupled to said control valve to act thereon in opposition to said spring, and an expansive aneroid chamber exposed to atmospheric pressure and coupled to said spring so as to increase the pressure exerted by said spring on said control valve with decrease in external atmospheric pressure.

8. In combination, a pivoted valve structure, a tension spring connected to said valve structure and acting to move said valve structure in one direction about its pivot axis, an expansive chamber connected to said valve structure and arranged to move said valve structure in the opposite direction about its pivot axis, and a tension spring anchored at one end and connected at the other end to said valve structure at a point spaced from the pivot axis of the latter and extending and acting on said valve structure along a direction line passing relatively close to but one side of said pivot axis.

9. In a control system for a supercharged aircraft cabin having an air outlet: a movable valve controlling said air outlet, pneumatic means for operating said valve, and an air control valve for said pneumatic means embodying a pivoted air valve structure, a tension spring connected to said air valve structure and acting to move said valve structure in one direction about its pivot axis, an expansive chamber connected to said valve structure and arranged to move said valve structure in the opposite direction about its pivot axis, and a tension spring anchored at one end and connected at the other end to said valve structure at a point spaced from the pivot axis of the latter and extending and acting on said valve structure along a direction line passing relatively close to but one side of said pivot axis.

10. In a control system for a supercharged aircraft cabin having an air outlet: a movable valve controlling said air outlet, a vacuum supply line, vacuum controlled means connected to said line adapted to operate said valve, a control valve in said vacuum supply line, a spring for urging said control valve to move in a direction to effect operation of said vacuum controlled means causing closing movement of said air outlet valve, and an expansive chamber exposed externally to cabin pressure and internally to outside atmospheric pressure, said chamber having a movable wall operatively coupled to said control valve to act thereon in opposition to said spring, and an expansive aneroid chamber exposed to atmospheric pressure and coupled to said control valve so as to add to the pressure exerted on said control valve by said spring in accordance with decrease in external atmospheric pressure.

11. In a control system for a supercharged aircraft cabin having an air outlet: a movable valve controlling said air outlet, a vacuum supply line, vacuum controlled means connected to said line adapted to operate said valve, a control valve in said vacuum supply line, a resilient expansive aneroid chamber, exposed externally to external atmospheric pressure, coupled to said control valve in a manner to urge it to move in a direction to effect operation of said vacuum controlled means causing closing movement of said air outlet valve in response to decrease in external atmospheric pressure, and a resilient expansive chamber, exposed externally to cabin pressure and internally to external atmospheric pressure, coupled to said control valve to act thereon in opposition to said aneroid resilient expansive chamber.

12. In a control system for a supercharged aircraft cabin having an air outlet: a movable valve controlling said air outlet, a vacuum supply line, vacuum controlled means connected to said line adapted to operate said valve, a control valve in said vacuum supply line, a spring for urging said control valve to move in a direction to effect operation of said vacuum controlled means causing closing movement of said air outlet valve, a differential pressure responsive means coupled to said control valve to act thereon in opposition to said spring in accordance with the differential of pressures internally and externally of the cabin, and means absolutely responsive to external atmospheric pressure coupled to and acting on said control valve in the same direction as said spring and in an increasing degree with decreasing external atmospheric pressure.

13. In a control system for a supercharged aircraft cabin having an air outlet: a movable valve controlling said air outlet, air controlled means for operating said valve, an air flow control valve for controlling the pressure of air applied to said air controlled means, a spring for urging said air flow control valve to move in a direction to effect operation of said air controlled means causing closing of the air outlet valve, differential pressure responsive means coupled to said air flow control valve to act thereon in opposition to said spring in accordance with the differential of pressures internally and externally of the cabin, and means responsive to external atmospheric pressure coupled to and acting on said air flow control valve in the same direction as said spring and in an increasing degree with decreasing external atmospheric pressure.

14. In a control system for a supercharged aircraft cabin having an air outlet: a vacuum controllable valve controlling said air outlet and adapted to open said air outlet to a degree dependent upon the vacuum applied thereto, a source of vacuum, vacuum connections and controls between said source of vacuum and said vacuum controllable valve including a vacuum line containing a first control valve and a by-pass vacuum line including a second control valve connected in shunt with said first control valve, said first control valve being normally open, and said second control valve being normally closed, absolute pressure responsive means exposed to cabin interior pressure and operable throughout a predetermined pressure range to gradually close the first control valve in response to tendency of cabin pressure to fall, whereby cabin pressure is maintained substantially constant, and differential pressure responsive means, exposed to the differential of cabin pressure and external atmospheric pressure, for gradually opening said second control valve upon increase of said differential pressure above a predetermined value.

15. In a control system for a supercharged aircraft cabin having an air outlet: a pneumatically operable valve controlling said air outlet, a pneumatic control line, a first control valve in said line, a branch line by-passing said first control valve, a second control valve in said branch line, absolute pressure responsive means exposed to cabin pressure controlling said first control valve, and differential pressure responsive means, exposed to the differential of cabin pressure and external atmospheric pressure, controlling said second control valve.

LEO NEVIN SCHWIEN.